US010102846B2

(12) United States Patent
Braz et al.

(10) Patent No.: US 10,102,846 B2
(45) Date of Patent: Oct. 16, 2018

(54) SYSTEM, METHOD AND COMPUTER PROGRAM PRODUCT FOR ASSESSING THE CAPABILITIES OF A CONVERSATION AGENT VIA BLACK BOX TESTING

(71) Applicant: International Business Machines Corporation, Armonk, NY (US)

(72) Inventors: Alan Braz, São Paulo (BR); Heloisa Caroline De Souza Pereira Candello, São Paulo (BR); Claudio Santos Pinhanez, São Paulo (BR); Marisa Affonso Vasconcelos, São Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/338,695

(22) Filed: Oct. 31, 2016

(65) Prior Publication Data

US 2018/0122363 A1    May 3, 2018

(51) Int. Cl.
| G10L 15/01 | (2013.01) |
| G10L 13/08 | (2013.01) |
| G10L 15/18 | (2013.01) |
| G10L 25/51 | (2013.01) |
| G10L 15/30 | (2013.01) |
| G10L 15/22 | (2006.01) |

(52) U.S. Cl.
CPC .............. *G10L 15/01* (2013.01); *G10L 13/08* (2013.01); *G10L 15/18* (2013.01); *G10L 15/22* (2013.01); *G10L 15/30* (2013.01); *G10L 25/51* (2013.01)

(58) Field of Classification Search
USPC .................................................. 704/270, 275
See application file for complete search history.

(56) References Cited

U.S. PATENT DOCUMENTS

| 2004/0268199 A1* | 12/2004 | Phelps .................. G06F 11/263 |
| | | 714/742 |
| 2016/0026608 A1* | 1/2016 | Curin ...................... G10L 15/22 |
| | | 715/230 |

OTHER PUBLICATIONS

Mel, et al. "The NIST Definition of Cloud Computing". Recommendations of the National Institute of Standards and Technology. Nov. 16, 2015.

* cited by examiner

*Primary Examiner* — Abdul Azad
(74) *Attorney, Agent, or Firm* — Louis J. Percello, Esq.; McGinn IP Law Group, PLLC (57) ABSTRACT

A conversational agent capability assessment method, system, and computer program product, includes obtaining data to create at least one scenario for testing a conversational agent, performing a set of tests using a scenario of the at least one scenario created to assess a capability of the conversational agent, and comparing a result of the capability from the set of tests with an expected result of the scenario.

19 Claims, 6 Drawing Sheets

| Conversational Agents \ Metrics | Conversational Agent 1 Version 1.0 | Conversational Agent 2 Version 1.0 | Conversational Agent 2 version 2.0 | Comparative Summary |
|---|---|---|---|---|
| Performance metrics | | | | |
| Natural Language ability | | score or graphic | | |
| Cognitive measures | | | | |
| Pattern dialog flow | | | | |
| Resp. to unexpected situations | | | | |
| Overall Summary for each Agent | | | | |

Report Generated After Running Testing Scenarios

SYSTEM, METHOD AND COMPUTER PROGRAM PRODUCT FOR ASSESSING THE CAPABILITIES OF A CONVERSATION AGENT VIA BLACK BOX TESTING

BACKGROUND

The present invention relates generally to a conversational agent capability assessment method, and more particularly, but not by way of limitation, to a system, method, and computer program product for assessing performance, personality and cognitive traits of conversational agents based on natural written language by other conversational agents.

Testing a conversational agent is not a trivial task. A conversational agent has many aspects to be tested from the performance across multiple users to matching the best response for a given answer. Further, conversational agents also may interact amongst each other (i.e., a hotel room booking agent may interact with a rental car booking agent or a first version (V1) of a conversational agent with a second version (V2) of the conversational agent) which adds an additional layer of difficulty for testing.

SUMMARY

In an exemplary embodiment, the present invention can provide a computer-implemented conversational agent capability assessment method, the method including obtaining data to create scenarios for testing a conversational agent, performing a set of tests using a scenario of the created scenarios to assess a capability of the conversational agent, and comparing a result of the capability from a set of tests with an expected result of the scenario.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

The invention will now be described with reference to FIGS. 1-6, in which like reference numerals refer to like parts throughout. It is emphasized that, according to common practice, the various features of the drawing are not necessarily to scale. On the contrary, the dimensions of the various features can be arbitrarily expanded or reduced for clarity.

Figure 1:
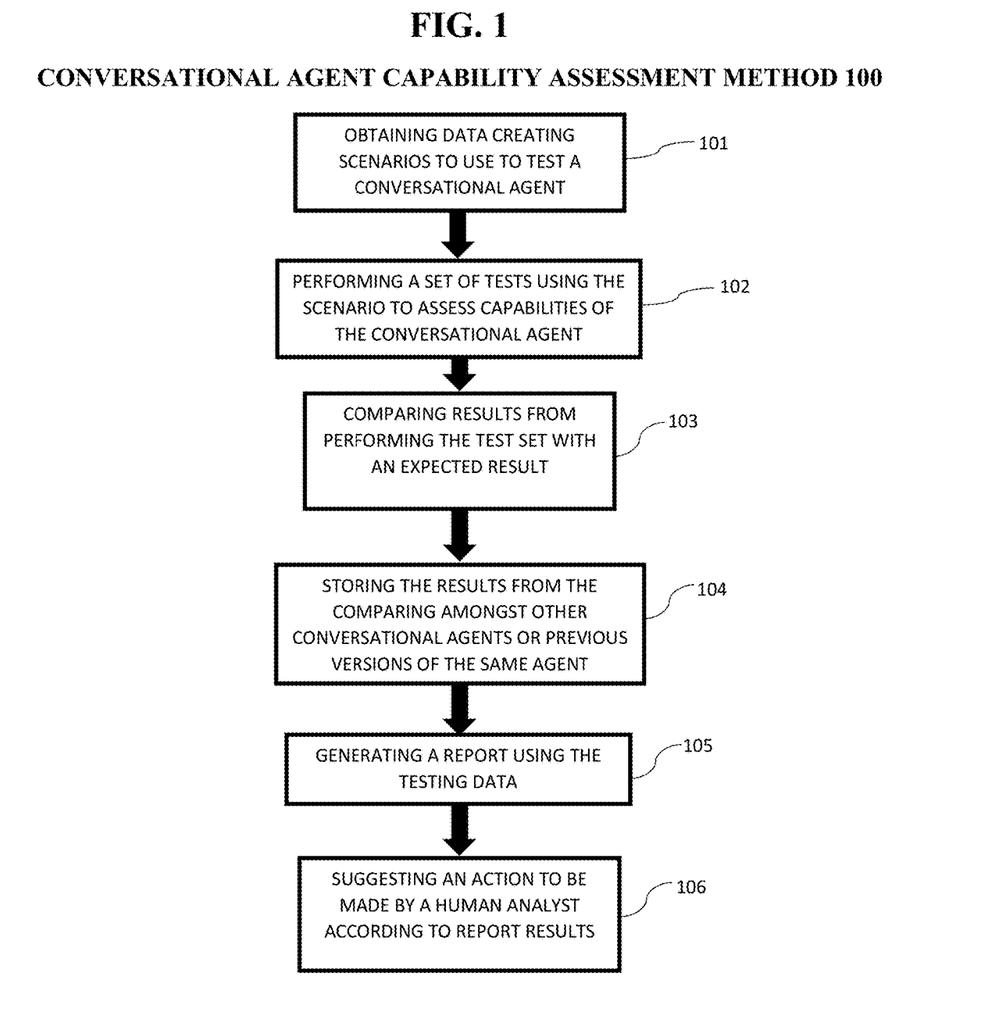
FIG. 1 exemplarily shows a high-level flow chart for a conversational agent capability assessment method 100.

With reference now to the example depicted in FIG. 1, the conversational agent capability assessment method 100 includes various steps to assess performance, personality and cognitive traits of conversational agents based on natural written language by other conversational agents, combine different metrics that analyze different aspects such as cognitive ability, performance and that affect the process of making those agents more intelligent, and the user adoption, and provide a way to test not familiar conversational agents systems (e.g., black box testing in which there is no knowledge (or little knowledge) of how the system was implemented). As shown in at least FIG. 4, one or more computers of a computer system 12 according to an embodiment of the present invention can include a memory 28 having instructions stored in a storage system to perform the steps of FIG. 1.

Thus, the conversational agent capability assessment method 100 according to an embodiment of the present invention may act in a more sophisticated, useful and cognitive manner, giving the impression of cognitive mental abilities and processes related to knowledge, attention, memory, judgment and evaluation, reasoning, and advanced computation. A system can be said to be "cognitive" if it possesses macro-scale properties—perception, goal-oriented behavior, learning/memory and action—that characterize systems (i.e., humans) generally recognized as cognitive.

Although one or more embodiments (see e.g., FIGS. 4-6) may be implemented in a cloud environment 50 (see e.g., FIG. 5), it is nonetheless understood that the present invention can be implemented outside of the cloud environment.

Figure 2:
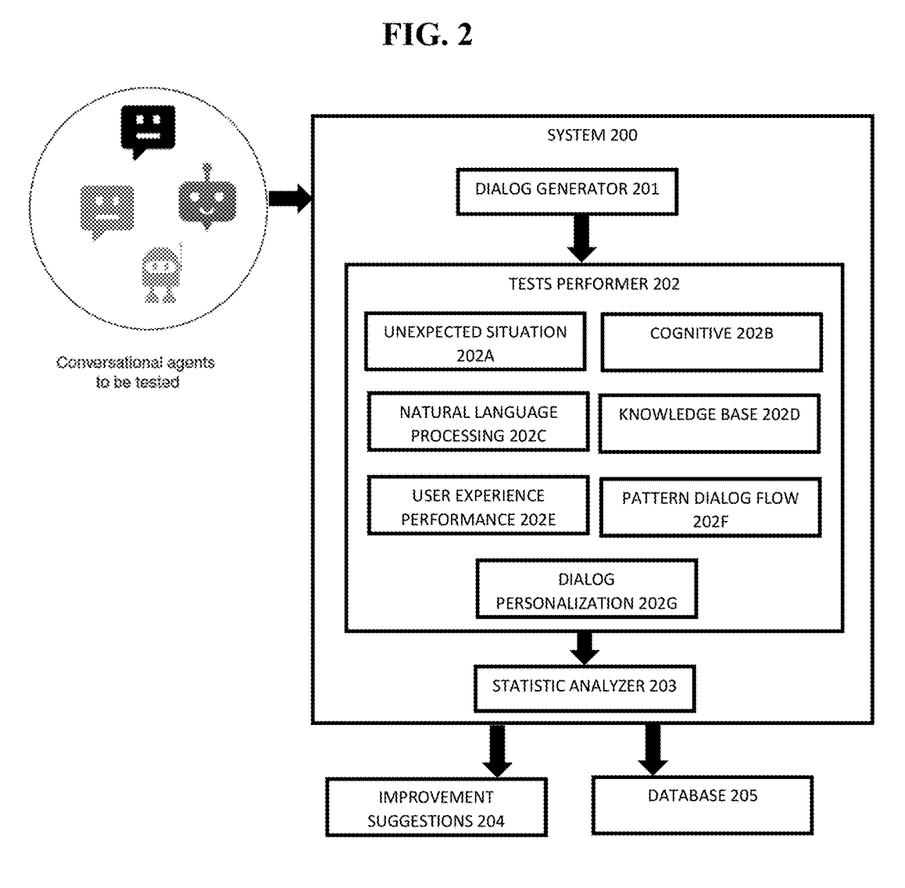
FIG. 2 exemplarily shows a system 200 for conversational agent capability assessment.

The method 100 and system 200 can provide a framework to test a conversational agent in several aspects emulating a real user embodied into a conversational agent. A conversational agent (i.e., chat box) typically includes a graphical interface for users to interact with the agent, a natural language processor to convert each question to a set of intentions, a knowledge base or corpus in which the bot retrieves answers based on the user intention, and a cognitive ability to adjust answers to the context of present dialog (i.e., the input questions/outputs answers). The method 100 and system 200 as described later can evaluate a conversational agent from performance metrics to the agent's cognitive abilities. The method 100 and system 200 not only provide a useful test for all these aspects for chat bot developers (i.e., which saves massive amounts of manual testing, especially for long utterances), but also provides a benefit for interface designers that can compare the test results with an ideal solution.

It is noted that although the embodiments described herein generally refer to a textual input for the chat box, the invention is not limited thereto. That is, the method 100 and system 200 can include a module that translates speech-totext and text-to-speech, extending the applicability of the conversational speech agents. For example, Siri® may be an example of a speech input conversational agent.

In step 101 (or the dialog generator 201), data is obtained to create scenarios (e.g., generate dialog to replicate scenarios) for testing the conversational agents. The data can be obtained from, for example, call-center logs, Watson™ conversational services, chat box logs, etc. The scenarios includes a plurality of user inputs intended to cause an aspect of the conversational agent to be triggered. For example, a user input of one scenario can include several typographical errors to test the chat bot's ability to determine a user's intent even with typographical errors. Another scenario can include a user input of several questions using different synonyms to determine the chat bot's ability to process a dialogue flow.

In step 102 (or by the test performer 202), a set of tests are performed using the scenarios created from the data to assess capabilities (or aspects) of the conversational agent. The set of tests can include, for example, testing the conversational agent for its natural language ability by testing its ability to recognize language protocols to start a conversational, testing the performance metrics of the conversational agent by running scenarios to test response time or how much time an agent takes to process a question and gives an answer, testing a pattern dialogue flow by using scenarios to test if a conversational agent is able to identify patterns in the text such as emoticons, symbols, etc., testing a response to unexpected situations by using scenarios that create, for example, typos, slangs, user aggressive language, etc., testing a dialog personalization by running scenarios to determine if a conversational agent is capable of changing its tone according to a name, a gender, an age, etc. of the user, testing a knowledge base of the conversational agent by running a scenario including both on-domain and off-domain questions (e.g., today's date, what is the capital of USA, etc.), testing cognitive measures of the chat bot by using several different taxonomies in scenarios (e.g., Bloom's, Piaget, etc.), testing for conversational speech systems by running scenarios that test noise levels, speech recognition, tone recognition, etc., or the like.

Although various examples of different tests and testing scenarios are given, the invention is not limited thereto. Many modifications and variations will be apparent to those of ordinary skill in the art without departing from the scope and spirit of the described embodiments.

That is, several testing metrics in combination or individually are considered for automatically assessing the performance or the capacity of a conversational agent.

In step 103 (or by the statistic analyzer 203), results from performing the set of tests in step 102 are compared with a set of expected results. For the target recipients (e.g., conversational agent designers and developers), a comparison among other conversational agents can provide valuable insights into improvements to their systems. For example, scenarios comparing two or more different conversational agent systems or two different versions (e.g., V1 and V2) of the same conversational agent. That is, the scope and the capabilities may be known in previous versions of the software and can be compared with the "black box" testing via step 102 to determine improvements or deficiencies of the chat bot.

In step 104 (or by the system 200), the results from the comparing amongst other conversational agents or previous versions of the same agent are stored in a database for future testing. Further, new scenarios for testing can be determined from the comparison results. For example, if the results show an increase in processing time for answers, a new scenario can be run to "stress test" the chat bot to determine a limit on the processing times.

Figure 3:
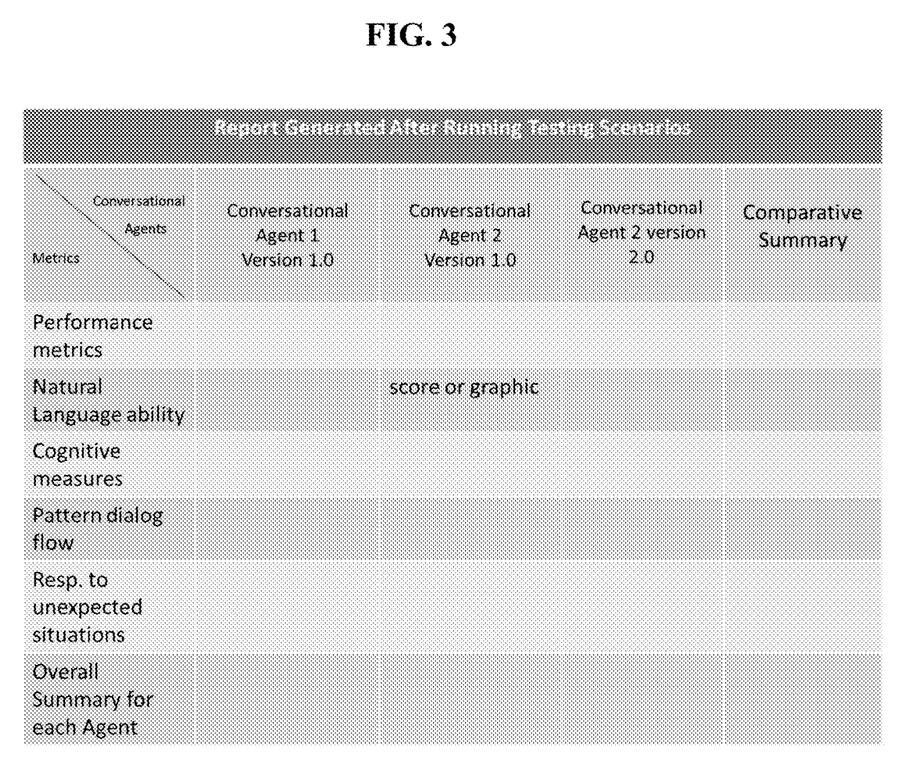
FIG. 3 exemplarily shows a report generated by the Step 105 after running testing scenarios.

In step 105 (or by the statistic analyzer 203), reports are generated using the testing data. The reports indicate the test results for each of the different scenarios such that a human developer can optimize the chat bot. FIG. 3 exemplarily shows a comparison among testing executions of different versions of the same conversational agent or different conversations agents (e.g. competitors comparison). Each metric is either displayed using a score (e.g., for performance metrics can be the response time in seconds) or graphically if metric comprises many measures such as the cognitive metric. The report provides a summary for each metric (e.g., last column of FIG. 3) comparing the best conversation agent for that metric. Finally, the last row (Overall Summary for each Agent) describes an overall comparison for that conversational agent. For example, conversational agent X respond better to unexpected results and needs to improve his natural language processor module.

In step 106 (improvement suggestions 204), an action to be made by a human analyst is suggested by analyzing the reports of the test results. That is, fixes or remedies to the agent's problems or issues may be suggested. For example, if the reports generated by step 105 indicate that the natural language processor became inefficient for version 2.0 of a given conversation agent X. The analyst can suggest that developers check what changes in implementation have caused the problem. For example, certain groups of questions were not covered in a given version of the conversation agent, the system than suggest that these questions should be added to the machine-leaning model of the agent.

In some embodiments, testing different user personalities, for example, by analyzing the type of words used by the conversational agent can be done to benefit developers. The results may reflect a less friendly communication between the agent and the end-user that can be adjusted (if needed) by the developers (e.g., dialog personalization).

In other embodiments, a high response time may indicate that the conversational system has limitations on its architecture. Very low response time may indicate that the end-user may find it difficult to read the displayed answers. And, a high number of repetitive answers from the conversational agent can indicate problems with its NLP module. This information can be useful for chat bot developers to adjust the chat bot to meet the specification requirements of the end user.

It is noted that "conversation agent" and "conversational agent" are used interchangeably and mean the same thing for the scope of the invention.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
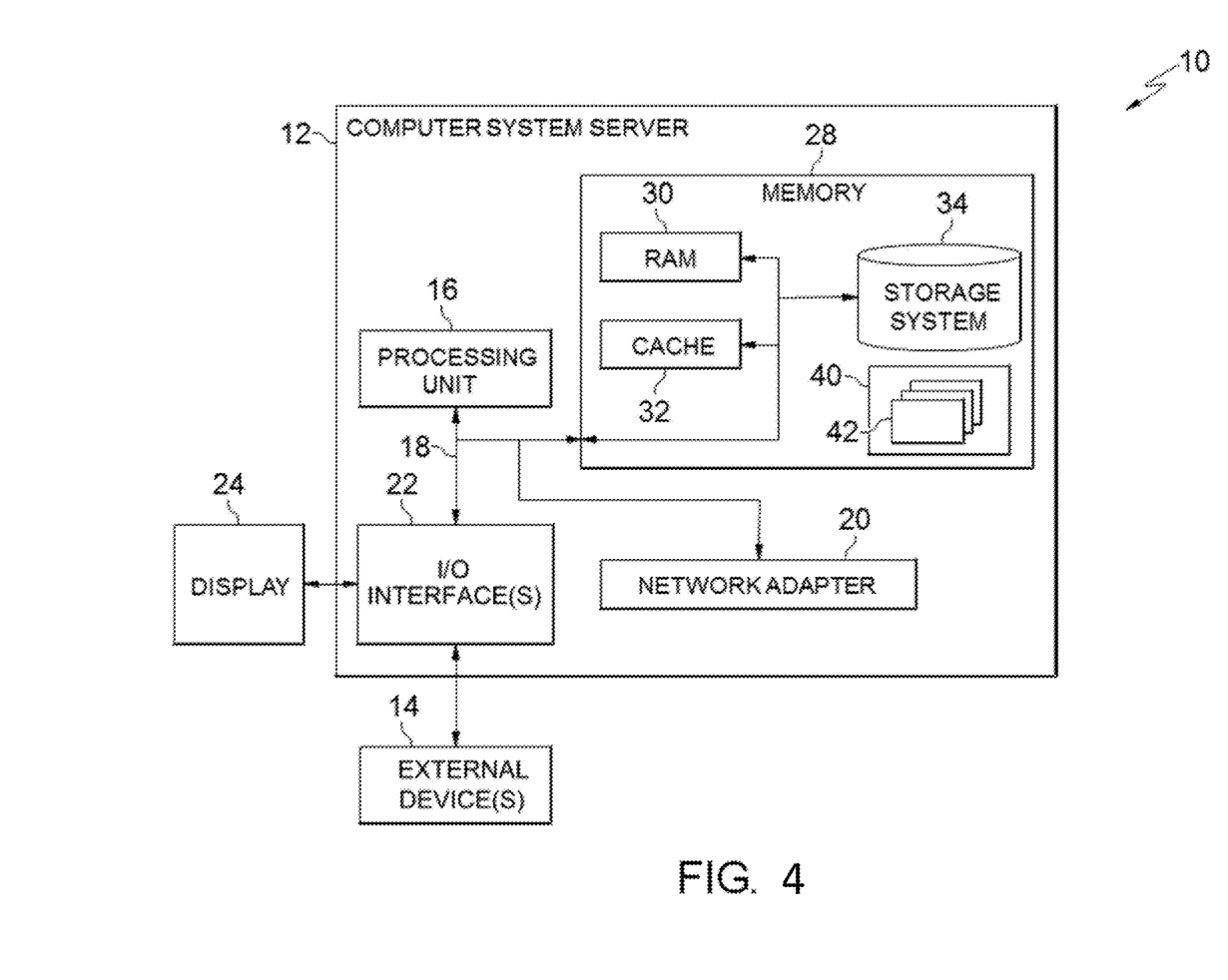
FIG. 4 depicts a cloud computing node 10 according to an embodiment of the present invention.

Referring now to FIG. 4, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 4, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 5:
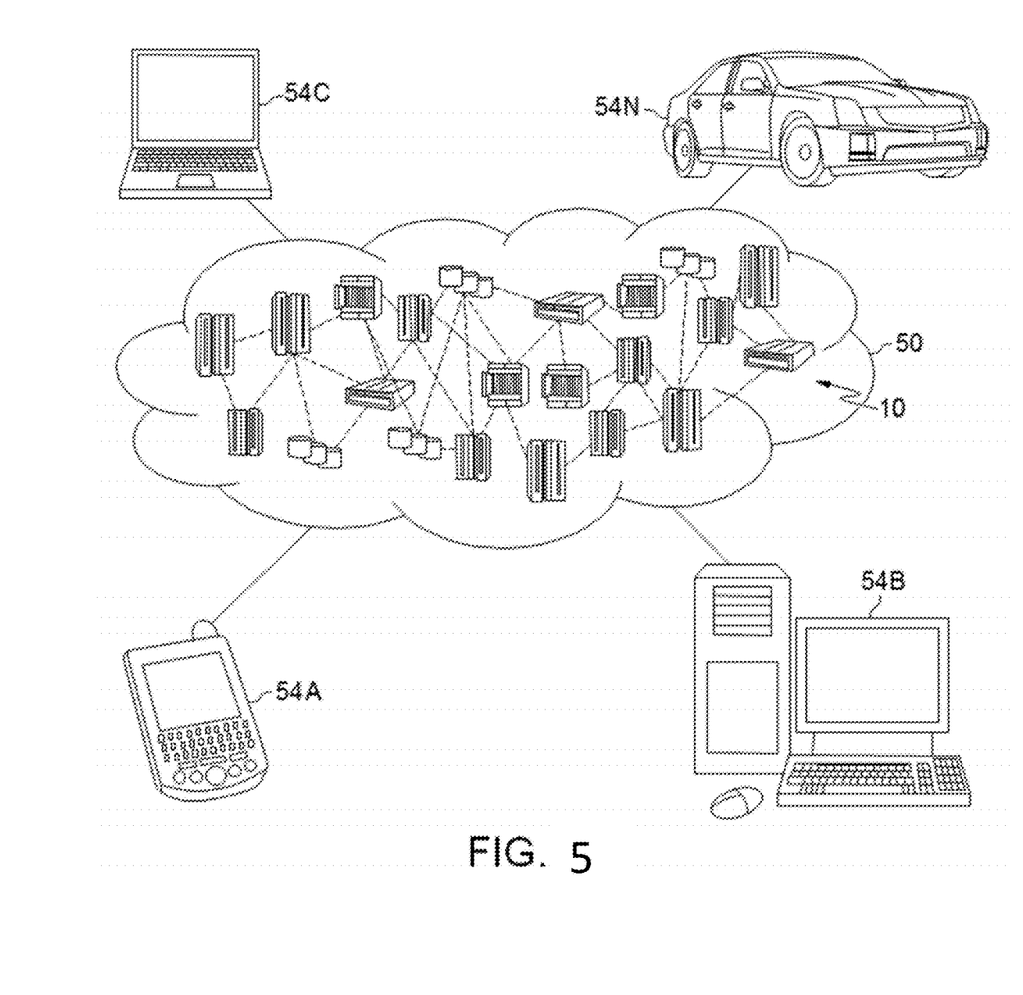
FIG. 5 depicts a cloud computing environment 50 according to an embodiment of the present invention.

Referring now to FIG. 5, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 5 are intended to be illustrative only and that computing nodes 10 and cloud computing environment 50 can communicate with any type of computerized circuit over any type of network and/or network addressable connection (e.g., using a web browser).

Figure 6:
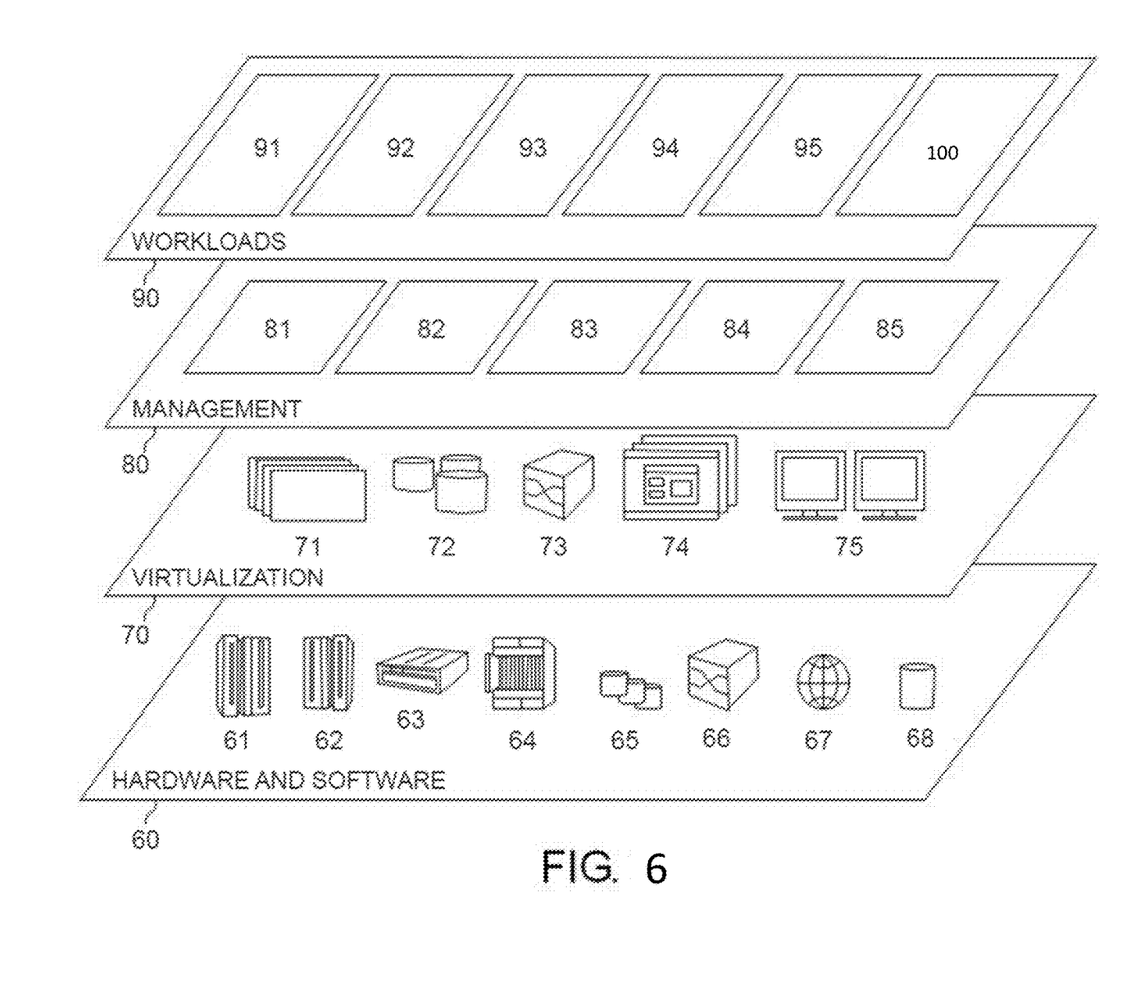
FIG. 6 depicts abstraction model layers according to an embodiment of the present invention.

Referring now to FIG. 6, an exemplary set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the conversational agent capability assessment method 100.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented conversational agent capability assessment method, the method comprising:
   obtaining data to create at least one scenario for testing a conversational agent in a conversational system having a non-deterministic output, the conversational agent being a software based on natural language classifiers;
   performing a set of tests using a scenario of the at least one scenario created to assess a capability of the conversational agent based on evaluation metrics generated from the set of tests while interacting with the conversational agent, the set of tests comprising testing a plurality of metrics including:
      a performance of the conversational agent;
      a linguistic variation;
      a personality type of the conversation agent; and
      a cognitive trait of the conversational agent; and
   comparing a result of the capability from the set of tests with an expected result of the scenario based on results from a different conversational agent,
   wherein the evaluation metrics are generated while interacting with the conversational system embodied in a cloud-computing environment.

2. The computer-implemented method of claim 1, wherein each of the at least one created scenario comprises a user input to cause an aspect of the conversational agent to be tested.

3. The computer-implemented method of claim 1, wherein the performing the set of tests comprises testing at least one of:
   a natural language ability of the conversational agent;
   pattern dialogue flow of the conversational agent;
   a response to an unexpected user input by the conversational agent; and
   a knowledge base of the conversational agent.

4. The computer-implemented method of claim 1, wherein the expected result includes at least one of:
   a capability of a different conversational agent; and
   a capability of a different version of a same conversational agent being tested.

5. The computer-implemented method of claim 1, wherein the at least one created scenario includes a speech-to-text and a text-to-speech conversion to assess the capability of the conversational agent for both of a textual input conversational agent and a speech input conversational agent.

6. The computer-implemented method of claim 1, further comprising storing the result from the set of tests to be used for a future comparison by the comparing.

7. The computer-implemented method of claim 1, further comprising generating a report of the result of the capability of the conversational agent for a human user.

8. The computer-implemented method of claim 7, further comprising suggesting an action for the human user to modify the conversational agent based on the report of the result of the capability of the conversational agent.

9. The computer-implemented method of claim 1, wherein the performing performs the set of tests by testing at least two of the plurality of testing metrics.

10. A computer program product for conversational agent capability assessment, the computer program product comprising a computer-readable storage medium having program instructions embodied therewith, the program instructions executable by a computer to cause the computer to perform:
    obtaining data to create at least one scenario for testing a conversational agent in a conversational system having a non-deterministic output, the conversational agent being a software based on natural language classifiers;
    performing a set of tests using a scenario of the at least one scenario created to assess a capability of the conversational agent based on evaluation metrics generated from the set of tests while interacting with the conversational agent, the set of tests comprising testing a plurality of metrics including:
       a performance of the conversational agent;
       a linguistic variation;
       a personality type of the conversation agent; and
       a cognitive trait of the conversational agent; and
    comparing a result of the capability from the set of tests with an expected result of the scenario based on results from a different conversational agent,
    wherein the evaluation metrics are generated while interacting with the conversational system embodied in a cloud-computing environment.

11. The computer program product of claim 10, wherein each of the at least one created scenario comprises a user input to cause an aspect of the conversational agent to be tested.

12. The computer program product of claim 10, wherein the performing the set of tests comprises testing at least one of:
    a natural language ability of the conversational agent;
    pattern dialogue flow of the conversational agent;
    a response to an unexpected user input by the conversational agent; and
    a knowledge base of the conversational agent.

13. The computer program product of claim 10, wherein the expected result includes at least one of:
    a capability of a different conversational agent; and
    a capability of a different version of a same conversational agent being tested.

14. The computer program product of claim 10, wherein the at least one created scenario includes a speech-to-text and a text-to-speech conversion to assess the capability of the conversational agent for both of a textual input conversational agent and a speech input conversational agent.

15. The computer program product of claim 10, further comprising storing the result from the set of tests to be used for a future comparison by the comparing.

16. The computer program product of claim 10, further comprising generating a report of the result of the capability of the conversational agent for a human user.

17. The computer program product of claim 16, further comprising suggesting an action for the human user to modify the conversational agent based on the report of the result of the capability of the conversational agent.

18. A conversational agent capability assessment system, said system comprising:
    a processor; and
    a memory, the memory storing instructions to cause the processor to perform:
       obtaining data to create at least one scenario for testing a conversational agent in a conversational system having a non-deterministic output, the conversational agent being a software based on natural language classifiers;
performing a set of tests using a scenario of the at least one scenario created to assess a capability of the conversational agent based on evaluation metrics generated from the set of tests while interacting with the conversational agent, the set of tests comprising testing a plurality of metrics including:
a performance of the conversational agent;
a linguistic variation;
a personality type of the conversation agent; and
a cognitive trait of the conversational agent; and
comparing a result of the capability from the set of tests with an expected result of the scenario based on results from a different conversational agent,
wherein the evaluation metrics are generated while interacting with the conversational system embodied in a cloud-computing environment.

19. The system of claim 18, wherein each of the at least one created scenario comprises a user input to cause an aspect of the conversational agent to be tested.

* * * * *